(12) United States Patent
Lu et al.

(10) Patent No.: US 11,328,194 B2
(45) Date of Patent: May 10, 2022

(54) GENERATION AND RECOGNITION OF BARCODE

(71) Applicant: BEIJING SANKUAI ONLINE TECHNOLOGY CO., LTD, Beijing (CN)

(72) Inventors: Hao Lu, Beijing (CN); Yan Li, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/982,814

(22) PCT Filed: Dec. 17, 2018

(86) PCT No.: PCT/CN2018/121511
§ 371 (c)(1),
(2) Date: Sep. 21, 2020

(87) PCT Pub. No.: WO2019/179182
PCT Pub. Date: Sep. 26, 2019

(65) Prior Publication Data
US 2021/0056369 A1     Feb. 25, 2021

(30) Foreign Application Priority Data

Mar. 19, 2018 (CN) .......................... 201810224770.2
Mar. 19, 2018 (CN) .......................... 201820371446.9

(51) Int. Cl.
*G06K 19/06* (2006.01)
*G06K 7/14* (2006.01)

(52) U.S. Cl.
CPC ..... *G06K 19/06168* (2013.01); *G06K 7/1421* (2013.01); *G06K 19/06028* (2013.01)

(58) Field of Classification Search
CPC .......... G06K 19/06168; G06K 7/1421; G06K 19/06028
See application file for complete search history.

(56) References Cited

U.S. PATENT DOCUMENTS 2,612,994 A     10/1952 Woodland et al.
4,809,251 A *   2/1989 Collomby .......... G11B 7/08505
                                                    369/275.3
(Continued)

FOREIGN PATENT DOCUMENTS

CN     101710389 A     5/2010
CN     103793735 A     5/2014
(Continued)

OTHER PUBLICATIONS

International Search Report of the International Searching Authority for State Intellectual Property Office of the People's Republic of China in PCT application No. PCT/CN2018/121511 dated Mar. 1, 2019, which is an International application corresponding to this U.S. application.

(Continued)

*Primary Examiner* — Thien M Le
*Assistant Examiner* — Asifa Habib
(74) *Attorney, Agent, or Firm* — Kolitch Romano LLP (57) ABSTRACT

A generation method for a barcode is disclosed. The generation method for a barcode includes: obtaining a dotted line segment based on a barcode generated in a reference encoding mode and an intersection between the barcode and a straight line perpendicular to a black stripe in the barcode; and rotating the dotted line segment by 180 degrees by using either one of two endpoints of the dotted line segment as a center of a circle, to generate a semicircular barcode.

20 Claims, 8 Drawing Sheets

(56) References Cited

U.S. PATENT DOCUMENTS

| | | | | |
|---|---|---|---|---|
| 5,332,895 A | * | 7/1994 | Rieder | G01D 5/34792 |
| | | | | 250/231.14 |
| 5,395,181 A | * | 3/1995 | Dezse | B41J 3/01 |
| | | | | 235/432 |
| 2007/0086653 A1 | * | 4/2007 | Javidi | G06K 7/1421 |
| | | | | 382/181 |
| 2011/0073651 A1 | | 3/2011 | Chiou et al. | |
| 2015/0310245 A1 | * | 10/2015 | Doraiswamy | G06K 7/1443 |
| | | | | 235/436 |

FOREIGN PATENT DOCUMENTS

| | | |
|---|---|---|
| CN | 106599969 A | 4/2017 |
| CN | 108491914 A | 9/2018 |
| TW | 201241752 A | 10/2012 |

OTHER PUBLICATIONS

Chinese National Intellectual Property Administration, First Office Action, dated Aug. 14, 2018 in Patent Application No. 201820371446.9, which is a foreign counterpart application corresponding to this U.S. Patent Application, to which this application claims priority.

* cited by examiner

GENERATION AND RECOGNITION OF BARCODE

This application is a national stage of PCT Application No. PCT/CN2018/121511, filed on Dec. 17, 2018 and entitled "GENERATION and RECOGNITION OF BARCODE". The PCT Application claims priority to Chinese Patent Application No. 201810224770.2, filed on Mar. 19, 2018 and entitled "GENERATION METHOD AND APPARATUS FOR BARCODE, RECOGNITION METHOD AND APPARATUS FOR BARCODE, PRINTED OBJECT, AND ELECTRONIC DEVICE", and Chinese Patent Application No. 201820371446.9, filed on Mar. 19, 2018 and entitled "PRINTED OBJECT, BARCODE GENERATOR, AND BARCODE RECOGNIZER," All of these applications are incorporated herein by reference in their entirety.

TECHNICAL FIELD

This disclosure relates to the technical field of graphic codes, and in particular, to generation and recognition of a barcode.

BACKGROUND

With the rapid expansion and development of the retail industry and consumer market, the widespread application of barcodes and labels has been promoted. The barcode is a graphic identifier that arranges a plurality of black stripes and blanks with different widths according to a particular encoding rule to express a group of information. A common barcode is a pattern of parallel lines arranged by black stripes (stripes for short) and white stripes (blanks for short) with very different reflectivities. The barcode can mark a lot of information such as a production country, a manufacturer, a commodity name, a production date, a book classification number, mail starting and ending positions, a category, and a date. Therefore, the barcode is widely used in many fields such as commodity circulation, book management, postal management, and a banking system.

SUMMARY

In view of this, embodiments of this disclosure provide a generation method and apparatus for a barcode, a recognition method and apparatus for a barcode, a barcode structure, an electronic device, and a non-transitory computer-readable storage medium.

According to an aspect of this disclosure, a generation method for a barcode is provided, the method including:
  obtaining a dotted line segment based on a barcode generated in a reference encoding mode and an intersection between the barcode and a straight line perpendicular to a black stripe in the barcode; and
  rotating the dotted line segment by 180 degrees by using either one of two endpoints of the dotted line segment as a center of a circle, to generate a semicircular barcode.

According to an aspect of this disclosure, a recognition method for a barcode is provided, the method including:
  scanning a to-be-recognized semicircular barcode through a center of a circle; and
  decoding the semicircular barcode in a reference decoding mode to obtain a first recognition result, where the reference decoding mode corresponds to a reference encoding mode used for generating a barcode, and the barcode is used to generate the to-be-recognized semicircular barcode.

According to another aspect of this disclosure, a printed object is provided, where a barcode is printed on the printed object, and the barcode includes:
  a semi-circle or circle, a center of the semi-circle or circle being an endpoint of a dotted line segment; and
  at least one sectorial barcode inside the semi-circle or circle, the sectorial barcode being generated by rotating the dotted line segment around the center of the circle by a set angle, and the dotted line segment being obtained based on a barcode generated in a reference encoding mode and an intersection between the barcode and a straight line perpendicular to a black stripe in the barcode.

It should be understood that the above general descriptions and the following detailed descriptions are merely for exemplary and explanatory purposes, and cannot limit the present disclosure.

BRIEF DESCRIPTION OF THE DRAWINGS

The accompanying drawings herein, which are incorporated in the specification as a part of the specification, show embodiments in accordance with this disclosure, and together with the specification are used to explain the principle of this disclosure.

DETAILED DESCRIPTION

Some embodiments are described in detail herein, and examples of the embodiments are shown in the accompanying drawings. When the following descriptions are made with reference to the accompanying drawings, unless indicated otherwise, same numbers in different accompanying drawings represent same or similar elements. The implementations described in the following embodiments do not represent all implementations consistent with this disclosure. On the contrary, the implementations are merely examples of apparatuses and methods that are described in detail in the appended claims and that are consistent with some aspects of this disclosure.

The terms used in this disclosure are merely for the purpose of describing specific embodiments, and are not intended to limit this disclosure. The terms "a", "said" and "the" of singular forms used in this disclosure and the appended claims are also intended to include plural forms, unless otherwise specified in the context clearly. It should also be understood that, the term "and/or" used herein indicates and includes any or all possible combinations of one or more associated listed items.

It should be understood that although the terms such as first, second, and third may be used herein to describe various information, such information should not be limited to these terms. These terms are merely used for distinguishing information of the same type from each other. For example, within the scope of this disclosure, first information may also be referred to as second information, and similarly, second information may also be referred to as first information. Depending on the context, the term "if" as used herein may be interpreted as "when . . . " or "upon . . . " or "in response to determining".

With the rapid expansion and development of the retail industry and consumer market, the widespread application of barcodes and labels has been promoted. The barcode is a graphic identifier that arranges a plurality of black stripes and blanks with different widths according to a particular encoding rule to express a group of information. A barcode is a pattern of parallel lines arranged by black stripes (stripes for short) and white stripes (blanks for short) with different reflectivities. The barcode can mark a lot of information such as a production country, a manufacturer, a commodity name, a production date, a book classification number, mail starting and ending positions, a category, and a date. Therefore, the barcode is widely used in many fields such as commodity circulation, book management, postal management, and a banking system.

When a commodity is recognized through code scanning, the scanning can be successful only when light of the code scanning gun is perpendicular to a barcode, that is, when the two are at a fixed angle. However, when the commodity is recognized, the light of the code scanning gun is usually not perpendicular to the barcode. In this case, a scanning direction of the code scanning gun needs to be adjusted. The operation is complicated and barcode recognition efficiency is low.

Figure 1A:
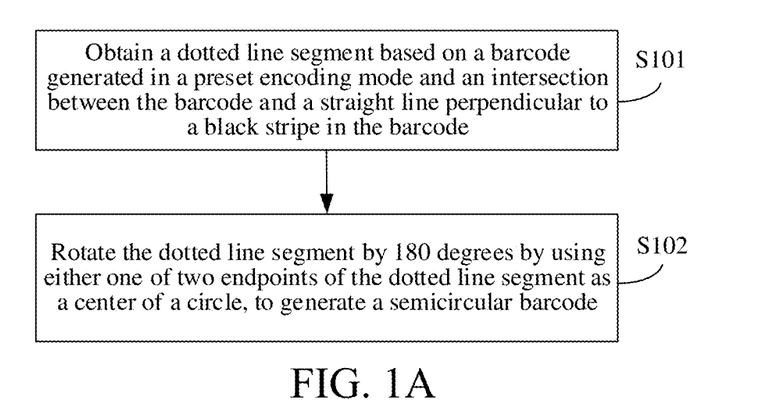
FIG. 1A is a flowchart of a generation method for a barcode according to some embodiments of this disclosure.

FIG. 1A is a flowchart of a generation method for a barcode according to some embodiments of this disclosure. The method is described from a perspective of a barcode generation device. As shown in FIG. 1A, the generation method for a barcode includes the following steps.

Step S101: Obtain a dotted line segment based on a barcode generated in a reference encoding mode and an intersection between the barcode and a straight line perpendicular to a black stripe in the barcode.

The barcode is a graphic identifier that arranges a plurality of black stripes and blanks with different widths according to a particular encoding rule to express a group of information. The barcode generation device may obtain a dotted line segment based on a barcode and an intersection between the barcode and a straight line perpendicular to a black stripe in the barcode. The barcode may be generated by using a reference encoding mode, and the reference encoding mode may include but is not limited to an encoding mode such as Code 39 or Code 128.

Step S102: Rotate the dotted line segment by 180 degrees by using either one of two endpoints of the dotted line segment as a center of a circle, to generate a semicircular barcode.

In this embodiment, after a dotted line segment is obtained, the dotted line segment may be rotated by 180 degrees by using either one of two endpoints of the dotted line segment as a center of a circle, to generate a semicircular barcode.

Figure 1B:
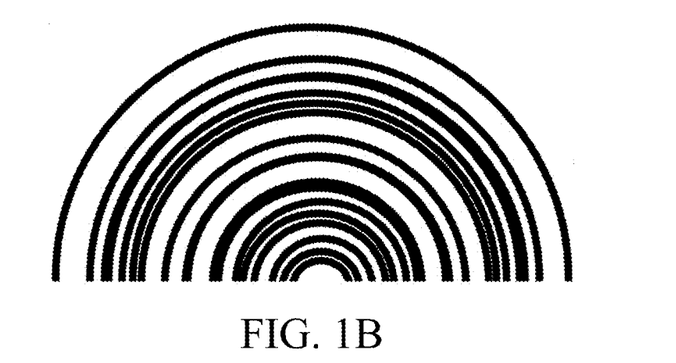
FIG. 1B is a schematic diagram of a barcode according to some embodiments of this disclosure.

For example, as shown in FIG. 1B, a dotted line segment may be rotated by 180 degrees by using one endpoint of the obtained dotted line segment as a center of a circle, to generate a semicircular barcode.

In the above embodiment, a dotted line segment is obtained based on a barcode and an intersection between the barcode and a straight line perpendicular to a black stripe in the barcode, and the dotted line segment is rotated by 180 degrees by using either one of two endpoints of the dotted line segment as a center of a circle, to generate a semicircular barcode. When the barcode recognition device scans the semicircular barcode through the center of the circle, scanning light of the barcode recognition device is always perpendicular to the semicircular barcode. In this way, the barcode can be recognized at any angle, so that a simple operation and high barcode recognition efficiency can be implemented.

Figure 1C:
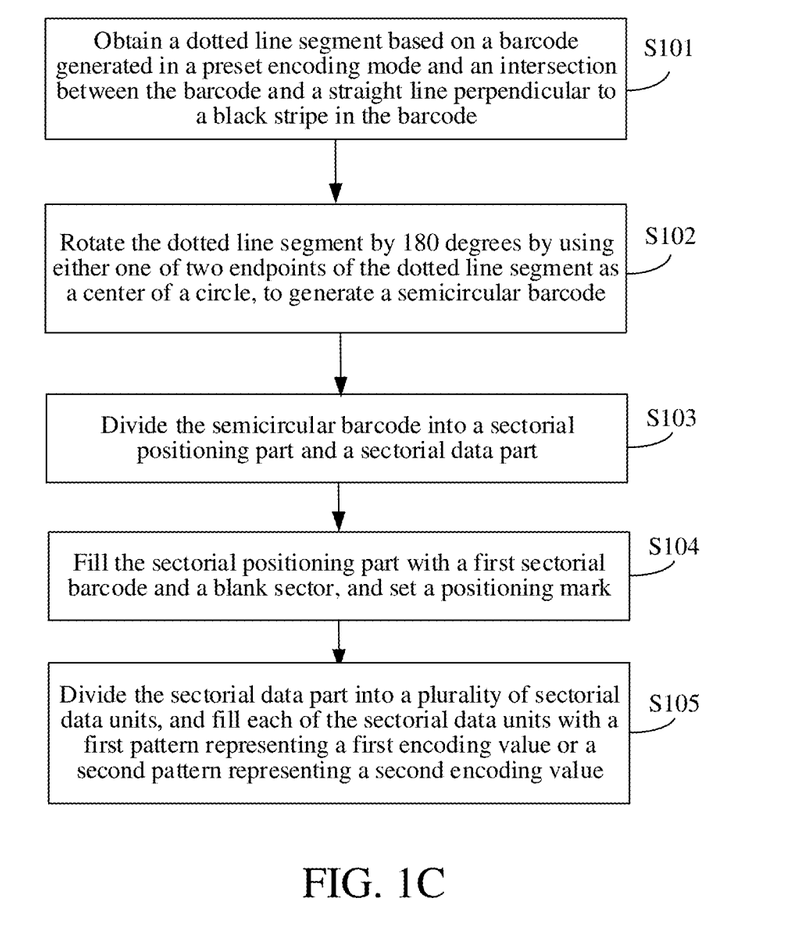
FIG. 1C is a flowchart of another generation method for a barcode according to some embodiments of this disclosure.

FIG. 1C is a flowchart of another generation method for a barcode according to some embodiments of this disclosure. As shown in FIG. 1C, the generation method for a barcode may further include the following steps based on the embodiment shown in FIG. 1A.

Step S103: Divide the semicircular barcode into a sectorial positioning part and a sectorial data part.

Step S104: Fill the sectorial positioning part with a first sectorial barcode and a blank sector, and set a positioning mark.

The sectorial positioning part is used to determine an encoding parameter, and the encoding parameter includes an encoding starting position and an encoding direction. The positioning mark may include but is not limited to a positioning dot, a positioning triangle, and the like. The first sectorial barcode is generated by rotating the dotted line segment by a first angle by using either one of the two endpoints of the dotted line segment as the center of the circle. The first angle is less than an angle corresponding to the sectorial positioning part.

Figure 2A:
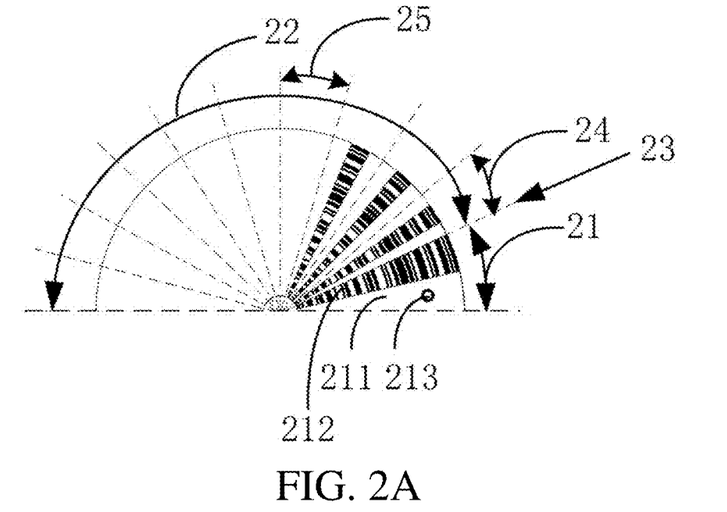
FIG. 2A is a schematic diagram of a semicircular barcode according to some embodiments of this disclosure.

As shown in FIG. 2A, a sectorial positioning part 21 includes a 15-degree blank sector 211 and a 15-degree first sectorial barcode 212, a positioning dot 213 is set on the 15-degree blank sector 211, and an encoding starting position 23 and a counterclockwise encoding direction may be determined according to the sectorial positioning part 21.

In another example, the sectorial positioning part may include a plurality of first sectorial barcodes and at least one blank sector. For example, the sectorial positioning part may include two 15-degree first sectorial barcodes 212 and one 15-degree blank sector 211, or two 15-degree first sectorial barcodes 212 and two 15-degree blank sectors 211.

In another example, the sectorial positioning part may include at least one first sectorial barcode and a plurality of blank sectors. For example, the sectorial positioning part may include one 15-degree first sectorial barcode 212 and two 15-degree blank sectors 211. When the sectorial positioning part includes a plurality of blank sectors, the positioning mark is set in a first blank sector. Herein, an angle of the blank sector is the same as an angle of the first sectorial barcode. This is only an example and not restrictive.

Step S105: Divide the sectorial data part into a plurality of sectorial data units, and fill each of the sectorial data units with a first pattern representing a first encoding value or a second pattern representing a second encoding value, where at least one of the first pattern and the second pattern includes a second sectorial barcode.

The first pattern or the second pattern may be filled for each of the sectorial data units according to the determined encoding parameter. This step may specifically include but is not limited to: filling each of the sectorial data units with the first pattern or the second pattern from the encoding starting position in the encoding direction. Both the first pattern and the second pattern may include a second sectorial barcode generated in the reference encoding mode. The second sectorial barcode is generated by rotating the dotted line segment by a second angle by using either one of the two endpoints of the dotted line segment as the center of the circle. The second angle is less than or equal to an angle corresponding to the sectorial data unit. In this case, in order to distinguish the first pattern and the second pattern, positions of second sectorial barcodes included in the first pattern and the second pattern may be different. For example, assuming that a sectorial data unit is 15 degrees, the sectorial data unit may be divided into three parts. The second sectorial barcode in the first pattern may be located in one of the three parts, and the second sectorial barcode in the second pattern may be located in either one of the other two parts. It should be noted that the position of the above second sectorial barcode is only an example. In practical applications, the second sectorial barcodes in the two patterns may be flexibly set as required, provided that the first pattern and the second pattern after the setting are different. Since there are many manners to set the second sectorial barcode, the manners are not listed herein.

Schematically, only one of the first pattern and the second pattern may include the second sectorial barcode, while the other pattern adopts a blank sector, to improve barcode generation and recognition efficiency.

For example, as shown in FIG. 2A, the sectorial data part 22 may be equally divided into 10 sectorial data units. In a case that the blank sector 211 and the first sectorial barcode 212 included in the sectorial positioning part are 30 degrees in total, each of the 10 sectorial data units is 15 degrees. Starting from the starting position 23, each of the sectorial data units is filled with a first pattern 24 representing a first encoding value 1 or a second pattern 25 representing a second encoding value 0 in a counterclockwise direction. Because 10 sectorial data units are included in FIG. 2A, 1024 semicircular barcodes may be generated by using the generation method provided in this embodiment.

It should be noted that FIG. 2A is only an example of a semicircular barcode. In practical applications, the sectorial data part may be divided into other quantities of sectorial data units, for example, 15 sectorial data units or 20 sectorial data units. Schematically, central angles corresponding different sectorial data units may be the same, or may be different. In addition, the sectorial positioning part may include two 15-degree blank sectors, positioning dots, and the like.

In this embodiment, the second sectorial barcodes included in the first pattern and the second pattern may be used to identify a product, and a manner of filling the first pattern and the second pattern in the sectorial data unit of the sectorial data part may be used to distinguish different individuals of a same type of products. It can be learned that the semicircular barcode can carry more information.

In the above embodiment, the sectorial data part is divided into a plurality of sectorial data units, and each of the sectorial data units is filled with the first pattern representing the first encoding value or the second pattern representing the second encoding value, so that the generated semicircular barcode can carry more encoding information.

Figure 3:
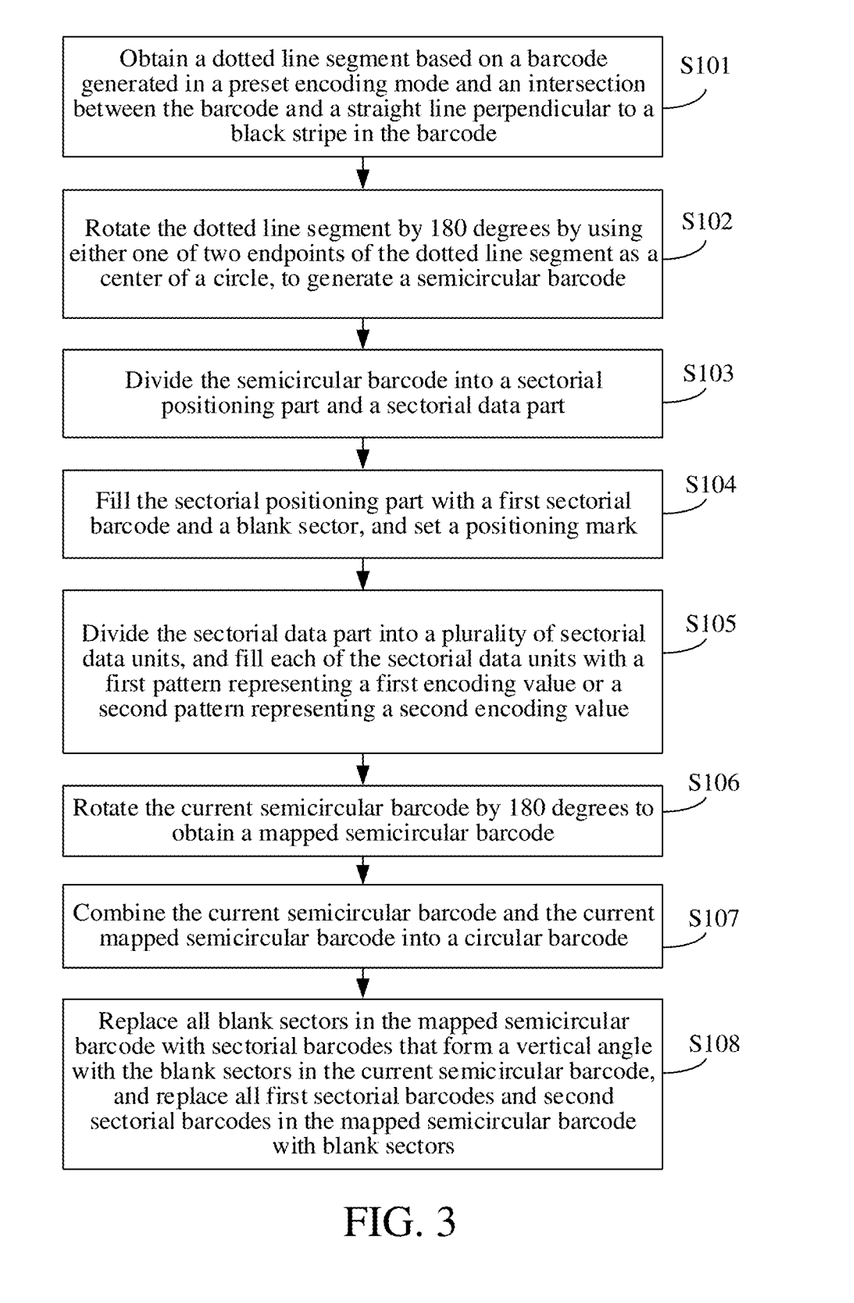
FIG. 3 is a flowchart of another generation method for a barcode according to some embodiments of this disclosure.

FIG. 3 is a flowchart of another generation method for a barcode according to some embodiments of this disclosure. As shown in FIG. 3, after step S105, the method may further include:

Step S106: Rotate the current semicircular barcode by 180 degrees to obtain a mapped semicircular barcode.

Step S107: Combine the current semicircular barcode and the current mapped semicircular barcode into a circular barcode.

Step S108: Replace all blank sectors in the mapped semicircular barcode with sectorial barcodes that form a vertical angle with the blank sectors in the current semicircular barcode, and replace all first sectorial barcodes and second sectorial barcodes in the mapped semicircular barcode with blank sectors.

In response to that the blank sector in the mapped semicircular barcode and a first sectorial barcode in the current semicircular barcode form a vertical angle, the blank sector is replaced with the first sectorial barcode. In response to that the blank sector in the mapped semicircular barcode and a second sectorial barcode in the current semicircular barcode form a vertical angle, the blank sector is replaced with the second sectorial barcode.

A first angle corresponding to the first sectorial barcode may be the same as a second angle corresponding to the second sectorial barcode. In response to that the first angle and the second angle are the same, because the first sectorial barcode and the second sectorial barcode are a same barcode, the blank sector may be replaced with the first sectorial barcode or the second sectorial barcode.

Figure 2B:
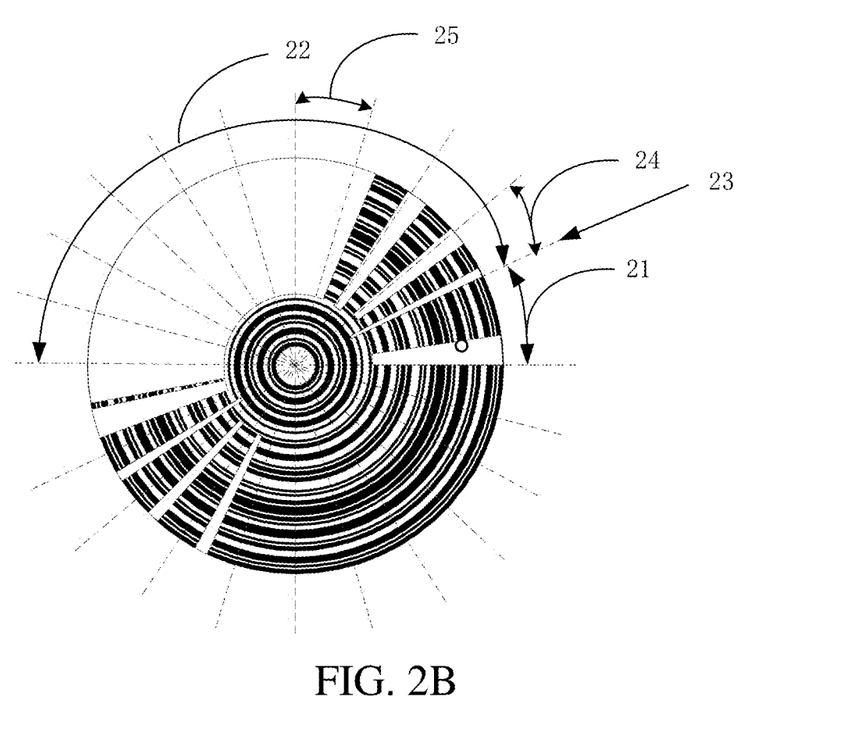
FIG. 2B is a schematic diagram of a circular barcode according to some embodiments of this disclosure.

For example, the current semicircular barcode shown in FIG. 2A is rotated by 180 degrees to obtain a mapped semicircular barcode; all blank sectors in the mapped semicircular barcode are replaced with sectorial barcodes that form a vertical angle with the blank sectors in the current semicircular barcode, and all first sectorial barcodes and second sectorial barcodes in the mapped semicircular barcode are replaced with blank sectors; and then the current semicircular barcode and the mapped semicircular barcode are combined to obtain the circular barcode shown in FIG. 2B.

All the blank sectors in the mapped semicircular barcode are replaced with the sectorial barcodes and all the first sectorial barcodes and the second sectorial barcodes are replaced with the blank sectors. Therefore, at least one barcode is scanned when light passes through the center of the circle in any direction, so that the circular barcode can be recognized at any angle, thereby improving scanning efficiency. In the above embodiment, the current semicircular barcode is rotated by 180 degrees to obtain the mapped semicircular barcode, all the blank sectors in the mapped semicircular barcode are replaced with the sectorial barcodes and all the first sectorial barcodes and the second sectorial barcodes in the mapped semicircular barcode are replaced with the blank sectors, and the current semicircular barcode and the current mapped semicircular barcode are combined into the circular barcode. Therefore, during the scanning, at least one barcode is scanned when light passes through the center of the circle in any direction, so that the circular barcode can be recognized at any angle, thereby improving scanning efficiency.

Figure 4A:
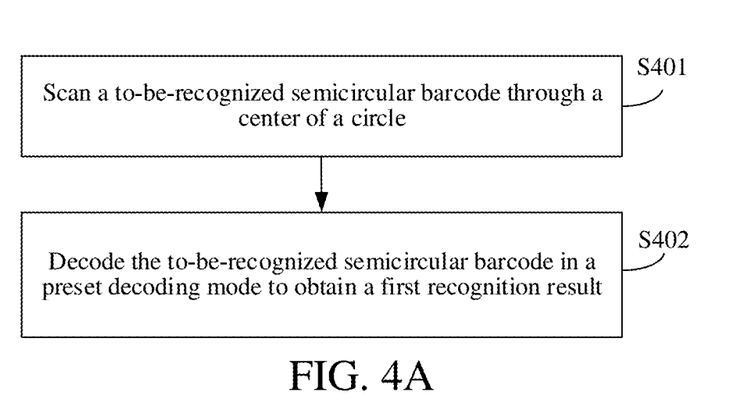
FIG. 4A is a flowchart of a recognition method for a barcode according to some embodiments of this disclosure.

FIG. 4A is a flowchart of a recognition method for a barcode according to some embodiments of this disclosure. The method is described from a perspective of a barcode recognition device. As shown in FIG. 4A, the recognition method for a barcode includes the following steps.

Step S401: Scan a to-be-recognized semicircular barcode through a center of a circle. The to-be-recognized semicircular barcode is generated based on a barcode.

Step S402: Decode the to-be-recognized semicircular barcode in a reference decoding mode to obtain a first recognition result. The reference decoding mode corresponds to a reference encoding mode used for generating the barcode.

For example, in FIG. 2A, assuming that the barcode included in the semicircular barcode is generated in a code 128 encoding mode, at least one of the first sectorial barcode and the second sectorial barcode may be decoded in a code 128 decoding manner to obtain the first recognition result 1234567890 of the semicircular barcode.

In the above embodiment, the to-be-recognized semicircular barcode is decoded in a reference decoding mode corresponding to the reference encoding mode used for generating the barcode, so that the barcode can be recognized at any angle. Therefore, recognition efficiency is high.

Figure 4B:
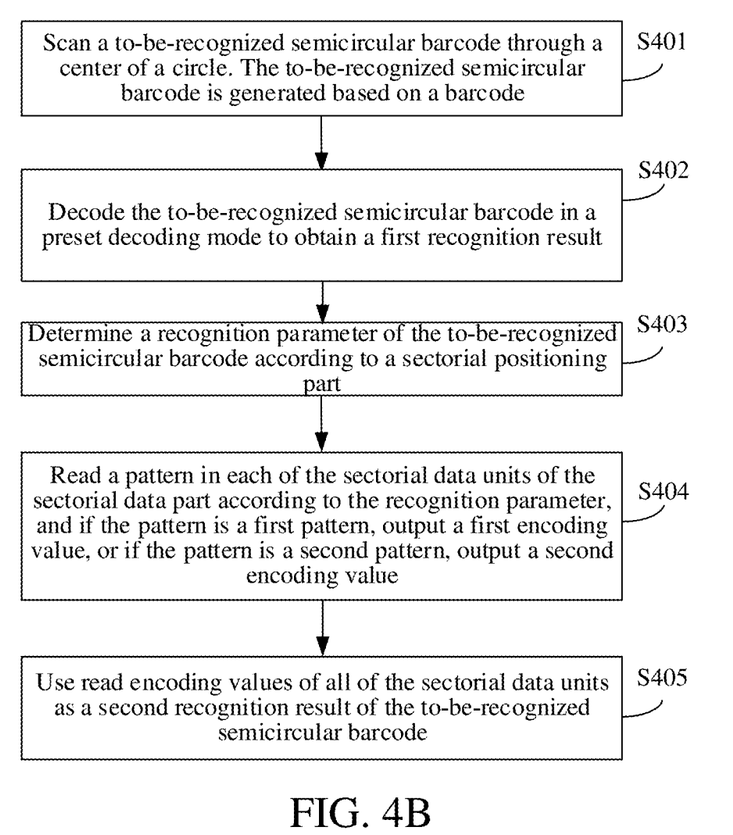
FIG. 4B is a flowchart of another recognition method for a barcode according to some embodiments of this disclosure.

FIG. 4B is a flowchart of another recognition method for a barcode according to some embodiments of this disclosure. As shown in FIG. 4B, the recognition method for a barcode includes the following steps.

Step S401: Scan a to-be-recognized semicircular barcode through a center of a circle, where the to-be-recognized semicircular barcode is generated based on a barcode.

Step S402: Decode the to-be-recognized semicircular barcode in a reference decoding mode to obtain a first recognition result. The reference decoding mode corresponds to a reference encoding mode used for generating the barcode.

Step S403: Determine a recognition parameter of the to-be-recognized semicircular barcode according to a sectorial positioning part.

The recognition parameter includes a starting position and a recognition direction.

For example, for the semicircular barcode shown in FIG. 2A, the starting position is a position 23 and the recognition direction is a counterclockwise direction according to the sectorial positioning part, that is, a 15-degree blank sector, a 15-degree sector with a barcode, and a positioning dot.

Step S404: Read a pattern in each of the sectorial data units of the sectorial data part according to the recognition parameter, and in response to that the pattern is a first pattern, output a first encoding value, or in response to that the pattern is a second pattern, output a second encoding value.

The reading a pattern in each of the sectorial data units of the sectorial data part according to the recognition parameter may include but is not limited to: sequentially reading patterns in sectorial data units in the recognition direction from the starting position.

For example, for the semicircular barcode shown in FIG. 2A, patterns in sectorial data units may be read in a counterclockwise direction from a recognition starting position. Because patterns of the read first three sectorial data units are first patterns, encoding values corresponding to the first three sectorial data units are all 1. Because patterns of the read last seven sectorial data units are second patterns, encoding values corresponding to the last seven sectorial data units are all 0.

Step S405: Use read encoding values of all of the sectorial data units as a second recognition result of the to-be-recognized semicircular barcode.

An encoding value 1110000000 corresponding to the 10 sectorial data units shown in FIG. 2A is used as the second recognition result of the to-be-recognized semicircular barcode.

A first recognition result 1234567890 may be a barcode of a commodity, and an individual of the commodity may be located through a second recognition result 1110000000, that is, different individuals may be recognized by recognizing different barcodes. In addition, the second recognition result may also be used to distinguish a particular category of commodities, for example, to distinguish a discounted commodity in commodities.

It should be noted that execution orders of steps S401 and S402 and steps S403 to S405 are not limited in this embodiment, that is, steps S401 and S402 may be performed first to obtain the first recognition result, and then steps S403 to S405 are performed to obtain the second recognition result, or steps S403 to S405 may be performed first to obtain the second recognition result, and then steps S401 and S402 are performed to obtain the first recognition result, or steps S401 and S402 and steps S403 to S405 are simultaneously performed.

In the above embodiment, the pattern in each of the sectorial data units of the sectorial data part of the to-be-recognized semicircular barcode is read according to the determined recognition parameter, and in response to that the pattern is the first pattern, the first encoding value is output, or in response to that the pattern is the second pattern, the second encoding value is output, and the read encoding values of all of the sectorial data units are used as the second recognition result of the to-be-recognized semicircular barcode. Therefore, a recognition manner is simple, and information about an individual or information about a category of a product can be recognized.

This disclosure further provides a printed object, where a barcode is printed on the printed object, and the barcode includes: a semi-circle, a center of the semi-circle being an endpoint of a dotted line segment; and at least one sectorial barcode inside the semi-circle, the sectorial barcode being generated by rotating the dotted line segment by a set angle by using either one of two endpoints of the dotted line segment as a center of a circle, and the dotted line segment being obtained based on a barcode generated in a reference encoding mode and an intersection between the barcode and a straight line perpendicular to a black stripe in the barcode.

When the semi-circle includes a sectorial barcode and the set angle is 180 degrees, the barcode printed on the printed object is a semicircular barcode, as shown in FIG. 1B.

In addition, the semi-circle may include a plurality of sectorial barcodes, for example, a plurality of sectorial barcodes with different angles.

Figure 5A:
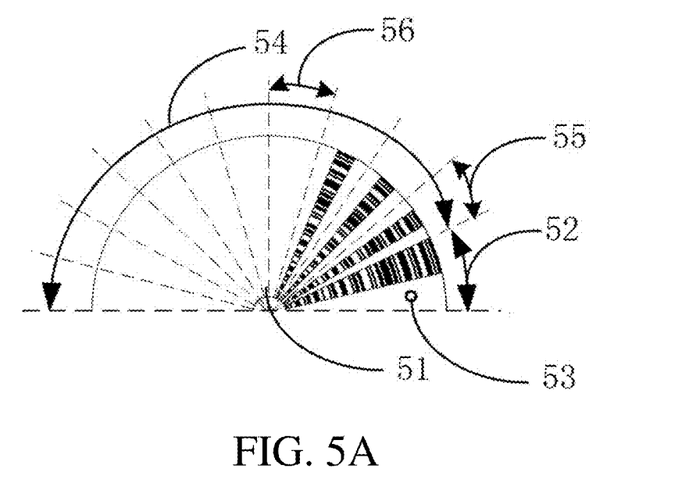
FIG. 5A is a schematic diagram of a barcode printed on a printed object according to some embodiments of this disclosure.

FIG. 5A is a schematic diagram of another barcode printed on a printed object. As shown in FIG. 5A, the barcode includes a semi-circle 51. The semi-circle 51 includes a sectorial positioning part 52 and a sectorial data part 54. The sectorial positioning part 52 includes a first sectorial barcode, a blank sector and a positioning mark 53 set on the blank sector. The sectorial data part 54 includes a plurality of sectorial data units of a same size or different sizes, and each of the sectorial data units is filled with a first pattern 55 representing a first encoding value or a second pattern 56 representing a second encoding value, where at least one of the first pattern and the second pattern includes a second sectorial barcode.

The first sectorial barcode is generated by rotating the dotted line segment by a first angle by using either one of two endpoints of the above dotted line segment as a center of a circle, the first angle being less than an angle corresponding to the sectorial positioning part.

Both the first pattern and the second pattern may include the second sectorial barcode generated in a reference encoding mode. The second sectorial barcode is generated by rotating the dotted line segment by a second angle by using either one of the two endpoints of the above dotted line segment as a center of a circle, the second angle being less than an angle corresponding to the sectorial data unit. In this case, in order to distinguish the first pattern and the second pattern, positions of second sectorial barcodes included in the first pattern and the second pattern may be different. For example, assuming that a sectorial data unit is 15 degrees, the sectorial data unit may be divided into three parts. The second sectorial barcode in the first pattern may be located in one of the three parts, and the second sectorial barcode in the second pattern may be located in either one of the other two parts. It should be noted that the position of the above second sectorial barcode is only an example. In practical applications, the second sectorial barcodes in the two patterns may be flexibly set as required, provided that the first pattern and the second pattern after the setting are different. Since there are many manners to set the second sectorial barcode, the manners are not listed herein.

Schematically, only one of the first pattern and the second pattern may include the second sectorial barcode, while the other pattern adopts a blank sector, to improve barcode generation and recognition efficiency.

It should be noted that FIG. 5A is only an example of a semicircular barcode. In practical applications, the sectorial data part may be divided into other quantities of sectorial data units, for example, 15 sectorial data units or 20 sectorial data units. Central angles corresponding different sectorial data units may be the same, or may be different. The sectorial positioning part may include two 15-degree blank sectors, positioning dots, and the like.

In this embodiment, the barcode included in the first pattern or the second pattern may be used to identify a product, and a manner of filling the first pattern or the second pattern in the sectorial data part of the semicircular barcode may be used to distinguish different individuals of a same type of products. It can be learned that the semicircular barcode can carry more information.

In addition, any barcode including the semicircular barcode with the structure shown in FIG. 5A belongs to the barcode to be protected in this embodiment.

According to the above printed object on which the above barcode is printed, the sectorial data part of the barcode is equally divided into a plurality of sectorial data units, and each of the sectorial data units is filled with the first pattern representing the first encoding value or the second pattern representing the second encoding value, so that the printed object on which the above barcode is printed can distinguish different individuals of a same type of products.

In addition, this disclosure further provides a printed object, where a barcode is printed on the printed object, and the barcode includes: a circle, a center of the circle being an endpoint of a dotted line segment; and at least one sectorial barcode inside the circle, the sectorial barcode being generated by rotating the dotted line segment around the center of the circle by a set angle, and the dotted line segment being obtained based on a barcode generated in a reference encoding mode and an intersection between the barcode and a straight line perpendicular to a black stripe in the barcode.

The circle includes a first semi-circle and a second semi-circle, and the first semi-circle includes a sectorial positioning part and a sectorial data part. The sectorial positioning part includes a first sectorial barcode, a blank sector, and a positioning mark set on the blank sector. The sectorial data part includes a plurality of sectorial data units of a same size, and each of the sectorial data units is filled with a first pattern representing a first encoding value or a second pattern representing a second encoding value, where at least one of the first pattern and the second pattern includes a second sectorial barcode. The second semi-circle includes a blank sector and a sectorial barcode, where the sectorial barcode in the second semi-circle and the blank sector in the first semi-circle form a vertical angle, and the blank sector in the second semi-circle and at least one of the first sectorial barcode and the second sectorial barcode in the first semi-circle form a vertical angle.

Figure 5B:
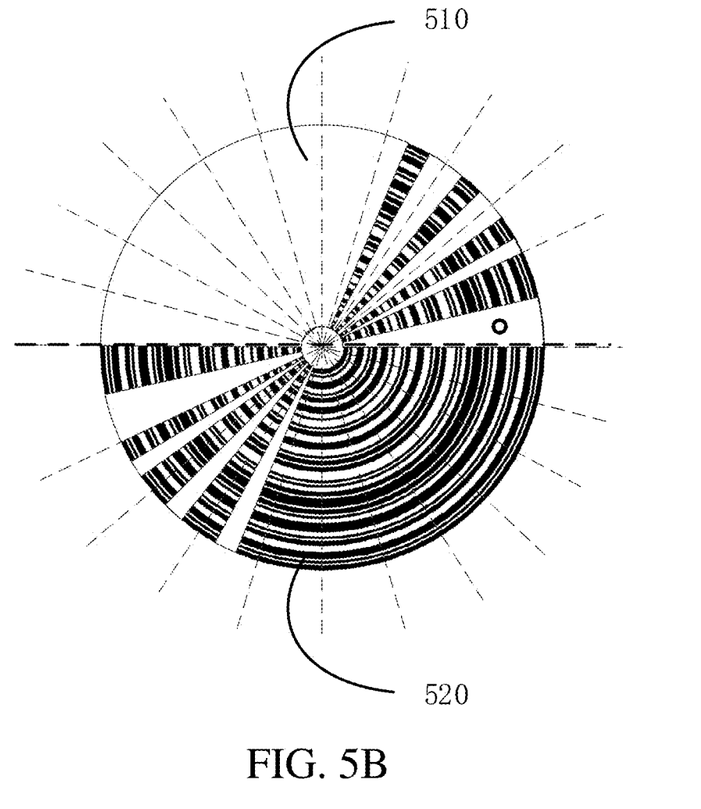
FIG. 5B is a schematic diagram of another barcode printed on a printed object according to some embodiments of this disclosure.

As shown in FIG. 5B, the barcode includes a circle, and the circle includes a first semi-circle 510 and a second semi-circle 520. A structure of the first semi-circle 510 may be the structure of the semicircular barcode shown in FIG. 5A, and details are not described herein again. The second semi-circle 520 includes a blank sector and a sectorial barcode. The sectorial barcode in the second semi-circle 520 and the blank sector in the first semi-circle 510 form a vertical angle, and the first sectorial barcode and the second sectorial barcode in the first semi-circle 510 and the blank sector in the second semi-circle 520 form a vertical angle.

According to the above printed object on which the above barcode is printed, at least one barcode is scanned when light passes through the center of the circle in any direction, so that the circular barcode can be recognized at any angle. In addition, the sectorial data part includes a plurality of sectorial data units of a same size, and each of the sectorial data units is filled with the first pattern representing the first encoding value or the second pattern representing the second encoding value, so that the generated circular barcode not only distinguishes types of products, but also can distinguish individuals of a same type of products.

In the embodiments of this disclosure, a dotted line segment is obtained based on a barcode and an intersection between the barcode and a straight line perpendicular to a black stripe in the barcode, and the dotted line segment is rotated by 180 degrees by using either one of two endpoints of the dotted line segment as a center of a circle, to generate a semicircular barcode. Because the semicircular barcode is generated by rotating the dotted line segment by using either one of the endpoints as the center of the circle, when a barcode recognition device scans the semicircular barcode through the center of the circle, the barcode can be recognized at any angle, so that a simple operation and high barcode recognition efficiency can be implemented.

Corresponding to the above embodiment of the generation method for a barcode, this disclosure further provides an embodiment of the generation apparatus for a barcode.

Figure 6:
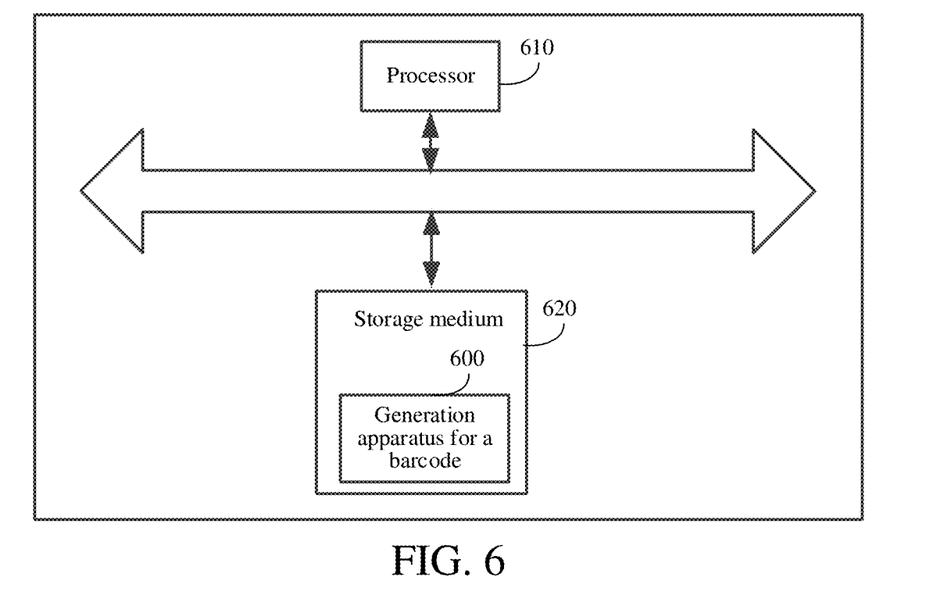
FIG. 6 is a hardware structure diagram of an electronic device on which a generation apparatus for a barcode is located according to some embodiments of this disclosure.

The embodiment of the generation apparatus for a barcode in this disclosure may be applied to an electronic device. The apparatus embodiment may be implemented by software, or by hardware or a combination of software and hardware. FIG. 6 is a hardware structure diagram of an electronic device on which a generation apparatus 600 for a barcode is located according to this disclosure. The electronic device includes a processor 610, a storage medium 620, and a machine executable instruction stored on the storage medium 620 and running on the processor 610. The processor 610 implements the above generation method for a barcode when executing the machine executable instruction.

Schematically, in addition to the processor 610 and the storage medium 620 shown in FIG. 6, the electronic device on which the apparatus is located in this embodiment generally may include other hardware according to the actual barcode generation function. Details are not described herein again.

Figure 7:
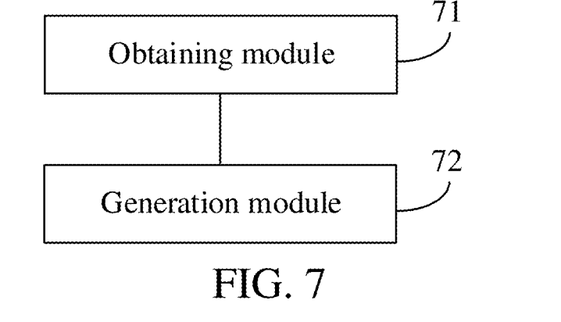
FIG. 7 is a block diagram of a generation apparatus for a barcode according to some embodiments of this disclosure.

FIG. 7 is a block diagram of a generation apparatus for a barcode according to some embodiments of this disclosure. As shown in FIG. 7, the apparatus includes: an obtaining module 71 and a generation module 72.

The obtaining module 71 is configured to obtain a dotted line segment based on a barcode generated in a reference encoding mode and an intersection between the barcode and a straight line perpendicular to a black stripe in the barcode.

The generation module 72 is configured to rotate the dotted line segment by 180 degrees by using either one of two endpoints of the dotted line segment obtained by the obtaining module 71 as a center of a circle, to generate a semicircular barcode.

A process of generating the semicircular barcode by the generation apparatus for a barcode with the structure shown in FIG. 7 may be as shown in FIG. 1A, and a specific implementation process is not be repeated herein.

In the above embodiment, a dotted line segment is obtained based on a barcode and an intersection between the barcode and a straight line perpendicular to a black stripe in the barcode, and the dotted line segment is rotated by 180 degrees by using either one of two endpoints of the dotted line segment as a center of a circle, to generate a semicircular barcode. Therefore, when a barcode recognition device scans the semicircular barcode through the center of the circle, the barcode can be recognized at any angle.

For details about the implementation processes of the functions and effects of the units in the foregoing apparatus, refer to the implementation processes of the corresponding steps in the foregoing method. Details are not described herein again.

In some embodiments, a non-transitory computer-readable storage medium is further provided. The non-transitory computer-readable storage medium stores a computer program, the computer program being configured to perform the generation method for a barcode. Schematically, the non-transitory computer-readable storage medium may be a read-only memory (ROM), a random access memory (RAM), a compact disk read-only memory (CD-ROM), a magnetic tape, a floppy disk, or an optical data storage device.

Corresponding to the above embodiment of the recognition method for a barcode, this disclosure further provides an embodiment of the recognition apparatus for a barcode.

Figure 8:
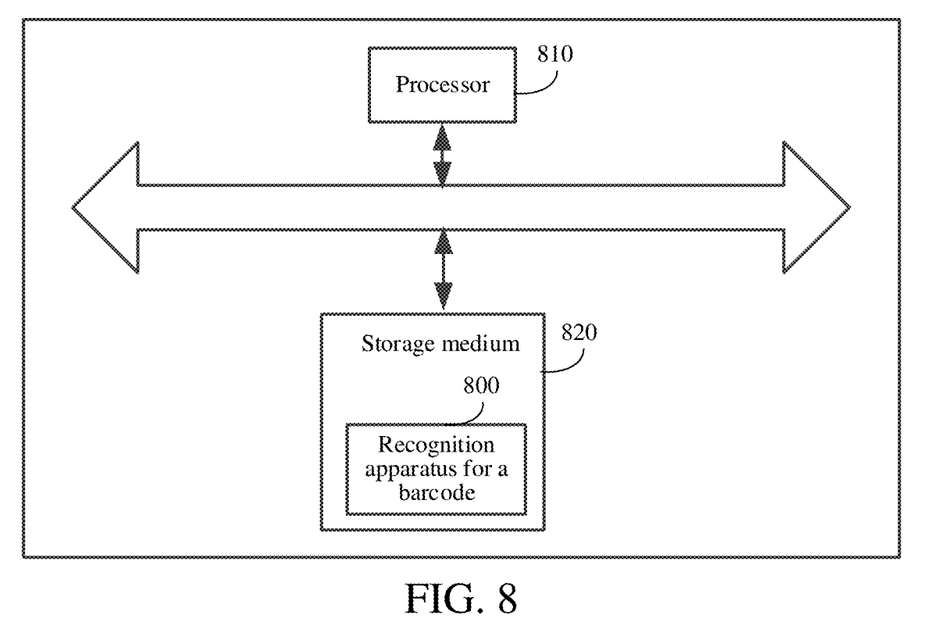
FIG. 8 is a hardware structure diagram of an electronic device on which a recognition apparatus for a barcode is located according to some embodiments of this disclosure.

The embodiment of the recognition apparatus for a barcode in this disclosure may be applied to an electronic device. The apparatus embodiment may be implemented by software, or by hardware or a combination of software and hardware. FIG. 8 is a hardware structure diagram of an electronic device on which a recognition apparatus 800 for a barcode is located according to this disclosure. The electronic device includes a processor 810, a storage medium 820, and a machine executable instruction stored on the storage medium 820 and running on the processor 810, and the processor 810 implements the above recognition method for a barcode when executing the machine executable instruction.

Schematically, in addition to the processor 810 and the storage medium 820 shown in FIG. 8, the electronic device on which the apparatus is located in this embodiment generally may include other hardware according to the actual barcode recognition function. Details are not described herein again.

Figure 9:
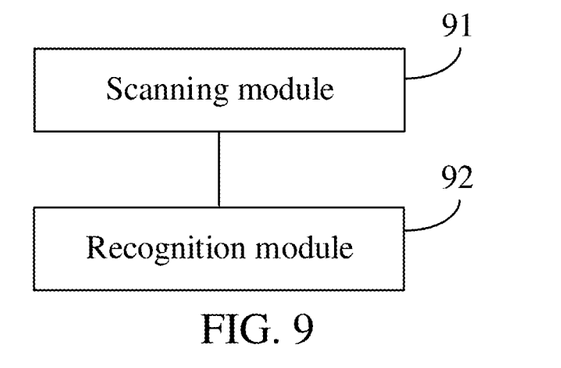
FIG. 9 is a block diagram of a recognition apparatus for a barcode according to some embodiments of this disclosure.

FIG. 9 is a block diagram of a recognition apparatus for a barcode according to some embodiments of this disclosure. As shown in FIG. 9, the recognition apparatus for a barcode includes a scanning module 91 and a recognition module 92.

The scanning module 91 is configured to scan a to-be-recognized semicircular barcode through a center of a circle, where the to-be-recognized semicircular barcode is generated based on a barcode.

The recognition module 92 is configured to decode, in a reference decoding mode, the to-be-recognized semicircular barcode scanned by the scanning module, to obtain a first recognition result, where the reference decoding mode corresponds to a reference encoding mode used for generating the barcode.

A process of recognizing the semicircular barcode by the recognition apparatus for a barcode with the structure shown in FIG. 9 may be as shown in FIG. 4A, and a specific implementation process is not be repeated herein.

In the above embodiment, the to-be-recognized semicircular barcode is decoded in a reference decoding mode corresponding to the reference encoding mode used for generating the barcode, so that the barcode can be recognized at any angle. Therefore, recognition efficiency is high.

For details about the implementation processes of the functions and effects of the units in the foregoing apparatus, refer to the implementation processes of the corresponding steps in the foregoing method. Details are not described herein again.

In some embodiments, a non-transitory computer-readable storage medium is further provided. The non-transitory computer-readable storage medium stores a computer program, the computer program being configured to perform the recognition method for a barcode. The non-transitory computer-readable storage medium may be a ROM, an RAM, a CD-ROM, a magnetic tape, a floppy disk, or an optical data storage device.

The apparatus embodiment basically corresponds to the method embodiment, and therefore for related parts, reference may be made to partial descriptions in the method embodiment. The described apparatus embodiment is merely an example. The units described as separate parts may or may not be physically separate, and parts displayed as units may or may not be physical units, may be located in one position, or may be distributed on a plurality of network units. The objective of the solution of the present disclosure may be implemented by selecting some or all of the modules according to actual needs. A person of ordinary skill in the art may understand and implement the embodiments of this application without creative efforts.

The above descriptions are merely some embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A barcode generation method, the method comprising:
obtaining a dotted line segment based on a barcode generated in a reference encoding mode and an intersection between the barcode and a straight line perpendicular to a black stripe in the barcode, wherein the barcode is a graphic identifier that arranges a plurality of black stripes and blanks with different widths;
rotating the dotted line segment by 180 degrees by using either one of two endpoints of the dotted line segment as a center of a circle, to generate a semicircular barcode;
dividing the semicircular barcode into a sectorial positioning part and a sectorial data part, wherein the sectorial positioning part is used to determine an encoding starting position and an encoding direction;
filling the sectorial positioning part with a first sectorial barcode and a blank sector, and setting a positioning mark on the blank sector; and
dividing the sectorial data part into a plurality of sectorial data units, and filling, by starting from the encoding starting position and in the encoding direction, each of the sectorial data units with a first pattern representing a first encoding value or a second pattern representing a second encoding value, wherein at least one of the first pattern and the second pattern comprises a second sectorial barcode.

2. The method according to claim 1, wherein the method further comprises:
rotating the semicircular barcode by 180 degrees to obtain a mapped semicircular barcode;
combining the semicircular barcode and the mapped semicircular barcode into a circular barcode; and
in the circular barcode, replacing all blank sectors in the mapped semicircular barcode with sectorial barcodes and replacing all first sectorial barcodes and second sectorial barcodes in the mapped semicircular barcode with blank sectors.

3. The method according to claim 2, wherein replacing all blank sectors in the mapped semicircular barcode with sectorial barcodes comprises:
in response to that the blank sector in the mapped semicircular barcode and the first sectorial barcode in the semicircular barcode have a vertical angle, replacing the blank sector with the first sectorial barcode; and
in response to that the blank sector in the mapped semicircular barcode and the second sectorial barcode in the semicircular barcode have a vertical angle, replacing the blank sector with the second sectorial barcode.

4. The method according to claim 1, wherein
in response to that the first pattern comprises the second sectorial barcode, causing the second pattern to be a blank sector.

5. The method according to claim 1, wherein
in response to that the second pattern comprises the second sectorial barcode, causing the first pattern to be a blank sector.

6. The method according to claim 1, wherein
the first sectorial barcode is obtained by rotating the dotted line segment around the center of the circle by a first angle, and the first angle is less than an angle of the sectorial positioning part; and
the second sectorial barcode is obtained by rotating the dotted line segment around the center of the circle by a second angle, and the second angle is less than or equal to an angle of the sectorial data unit.

7. A non-transitory computer-readable storage medium, wherein the non-transitory computer-readable storage medium stores a computer program, and the computer program is used to perform the barcode generation method for a barcode according to claim 1.

8. An electronic device, comprising a processor, a storage medium, and a machine executable instruction stored on the storage medium and running on the processor, wherein when the processor executes the machine executable instruction, the barcode generation method for a barcode according to claim 1 is implemented.

9. A barcode recognition method, the method comprising:
scanning a to-be-recognized semicircular barcode through a center of a circle, wherein the center is an endpoint of a dotted line segment, the semicircular barcode is generated by rotating the dotted line segment around the center by 180 degrees, and the dotted line segment is obtained based on an intersection between a barcode generated in a reference encoding mode and a straight line perpendicular to a black stripe in the barcode; the semicircular barcode comprises a sectorial positioning part and a sectorial data part; the sectorial positioning part is used to determine an encoding starting position and an encoding direction; the sectorial positioning part comprises a first sectorial barcode, a blank sector, and a positioning mark set on the blank sector; and the sectorial data part comprises a plurality of sectorial data units, each of the sectorial data units comprises a first pattern representing a first encoding value or a second pattern representing a second encoding value, and at least one of the first pattern and the second pattern comprises a second sectorial barcode; and
decoding the semicircular barcode in a reference decoding mode to obtain a first recognition result, wherein the reference decoding mode corresponds to a reference encoding mode used for generating the barcode.

10. The method according to claim 9, wherein the method further comprises:
determining a recognition parameter of the semicircular barcode according to the sectorial positioning part;
reading a pattern in each of the sectorial data units of the sectorial data part according to the recognition parameter, and in response to that the pattern is a first pattern, outputting a first encoding value, or in response to that the pattern is a second pattern, outputting a second encoding value; and
using the output encoding values of all of the sectorial data units as a second recognition result of the to-be-recognized semicircular barcode.

11. A non-transitory computer-readable storage medium, wherein the non-transitory computer-readable storage medium stores a computer program, and the computer program is used to perform the barcode recognition method for a barcode according to claim 9.

12. An electronic device, comprising a processor, a storage medium, and a machine executable instruction stored on the storage medium and running on the processor, wherein when the processor executes the machine executable instruction, the barcode recognition method for a barcode according to claim 9 is implemented.

13. The method according to claim 9, wherein the first pattern comprises the second sectorial barcode, and the second pattern is a blank sector.

14. The method according to claim 9, wherein the second pattern comprises the second sectorial barcode, and the first pattern is a blank sector.

15. The method according to claim 9, wherein the first sectorial barcode is obtained by rotating the dotted line segment around the center of the circle by a first angle, and the first angle is less than an angle of the sectorial positioning part; and the second sectorial barcode is obtained by rotating the dotted line segment around the center of the circle by a second angle, and the second angle is less than or equal to an angle of the sectorial data unit.

16. A printed object, wherein a barcode is printed on the printed object, and the barcode comprises:
 a first semi-circle, a center of the first semi-circle being an endpoint of a dotted line segment; and
 at least one sectorial barcode inside the first semi-circle, the sectorial barcode being generated by rotating the dotted line segment around the center of the first semi-circle by a set angle, the dotted line segment being obtained based on an intersection between a barcode generated in a reference encoding mode and a straight line perpendicular to a black stripe in the barcode; the first semi-circle comprising a sectorial positioning part and a sectorial data part; the sectorial positioning part being used to determine an encoding starting position and an encoding direction, and the sectorial positioning part comprising a first sectorial barcode, a blank sector, and a positioning mark set on the blank sector; and the sectorial data part comprising a plurality of sectorial data units, each of the sectorial data units comprising a first pattern representing a first encoding value or a second pattern representing a second encoding value, and at least one of the first pattern and the second pattern comprising a second sectorial barcode.

17. The printed object according to claim 16, wherein the barcode further comprises:
 a second semi-circle, the second semi-circle and the first semi-circle being combined into a circle, and the second semi-circle comprising a blank sector and a sectorial barcode, wherein
 the sectorial barcode in the second semi-circle and the blank sector in the first semi-circle form a vertical angle, and the blank sector in the second semi-circle and at least one of the first sectorial barcode and the second sectorial barcode in the first semi-circle form a vertical angle.

18. The printed object according to claim 16, wherein the first pattern comprises the second sectorial barcode, and the second pattern is a blank sector.

19. The printed object according to claim 16, wherein the second pattern comprises the second sectorial barcode, and the first pattern is a blank sector.

20. The printed object according to claim 16, wherein the first sectorial barcode is obtained by rotating the dotted line segment around the center of the first semi-circle by a first angle, and the first angle is less than an angle of the sectorial positioning part; and the second sectorial barcode is obtained by rotating the dotted line segment around the center of the first semi-circle by a second angle, and the second angle is less than or equal to an angle of the sectorial data unit.

\* \* \* \* \*